United States Patent
Tadano

(10) Patent No.: US 9,920,837 B2
(45) Date of Patent: Mar. 20, 2018

(54) SEALING DEVICE

(71) Applicant: NOK CORPORATION, Tokyo (JP)

(72) Inventor: Hikaru Tadano, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/112,041

(22) PCT Filed: Nov. 11, 2014

(86) PCT No.: PCT/JP2014/079788
§ 371 (c)(1),
(2) Date: Jul. 15, 2016

(87) PCT Pub. No.: WO2015/107760
PCT Pub. Date: Jul. 23, 2015

(65) Prior Publication Data
US 2016/0334017 A1  Nov. 17, 2016

(30) Foreign Application Priority Data
Jan. 16, 2014 (JP) ................... 2014-005902

(51) Int. Cl.
*F16J 15/3212* (2016.01)
*F16J 15/3236* (2016.01)
*F04B 53/00* (2006.01)

(52) U.S. Cl.
CPC .......... *F16J 15/3212* (2013.01); *F04B 53/00* (2013.01); *F16J 15/3236* (2013.01)

(58) Field of Classification Search
CPC ...... F16J 15/3212; F16J 15/3236; F16J 15/32; F16J 15/3232
See application file for complete search history.

(56) References Cited

U.S. PATENT DOCUMENTS 3,114,561 A * 12/1963 Creath ................ F16J 15/121
277/555
4,508,356 A * 4/1985 Janian ................ F16J 15/3208
267/1.5
(Continued)

FOREIGN PATENT DOCUMENTS

EP  2067996 A1  6/2009
EP  2487391 A1  8/2012
(Continued)

OTHER PUBLICATIONS

Extended European Search Report dated Oct. 10, 2017 (corresponding to EP 14879086.8).

*Primary Examiner* — Eugene G Byrd
(74) *Attorney, Agent, or Firm* — Harness, Dickey & Pierce, P.L.C.

(57) ABSTRACT

A sealing device suppresses deterioration of sealing properties due to plastic deformation (settling) of an outer circumferential lip, including a packing (10) having an outer circumferential lip (12) provided on a sealed fluid side and an inner circumferential lip (13) on an inner circumferential side, and a metal spring member (20) mounted in a mounting groove (11) and having an outer circumferential pressing portion (21) that extends radially outward and toward the sealed fluid side from a groove bottom of the mounting groove (11) and presses the outer circumferential lip (12) radially outward, and an inner circumferential pressing portion (22) that extends radially inward and toward the sealed fluid side from the groove bottom of the mounting groove (11) and presses the inner circumferential lip (13) radially inward. Among the outer circumferential lip (12) and the inner circumferential lip (13), a protrusion (13*a*) for preventing the spring member (20) from coming off is provided only on the inner circumferential lip (13).

2 Claims, 4 Drawing Sheets

(56) References Cited

U.S. PATENT DOCUMENTS

| | | | | |
|---|---|---|---|---|
| 5,799,953 A * | 9/1998 | Henderson | ............ | F16J 15/3236 277/554 |
| 5,984,316 A * | 11/1999 | Balsells | ............... | F16J 15/3212 277/553 |
| 5,992,856 A * | 11/1999 | Balsells | ............... | F16J 15/3236 277/553 |
| 6,161,838 A * | 12/2000 | Balsells | ............... | F16J 15/3216 277/511 |
| 7,942,423 B2 * | 5/2011 | Kondo | ................. | F16J 15/3228 277/353 |
| 2007/0180987 A1 * | 8/2007 | An | ....................... | F16J 15/3212 92/165 R |
| 2007/0222157 A1 | 9/2007 | Kondo et al. | | |
| 2009/0230630 A1 * | 9/2009 | Kondo | ................. | F16J 15/3236 277/553 |
| 2009/0267306 A1 * | 10/2009 | Eguchi | ................. | F16J 15/3236 277/562 |
| 2010/0166582 A1 * | 7/2010 | Racicot | ................. | F04B 39/041 417/437 |
| 2011/0037234 A1 * | 2/2011 | Balsells | ................ | F16J 15/3212 277/562 |
| 2011/0272892 A1 * | 11/2011 | Grace | .................... | F16J 15/166 277/395 |
| 2013/0043660 A1 * | 2/2013 | Daub | ................... | F16J 15/3212 277/500 |

FOREIGN PATENT DOCUMENTS

| | | |
|---|---|---|
| JP | S6327763 | 2/1968 |
| JP | 2003247646 A | 9/2003 |
| JP | 2005299808 A | 10/2005 |
| WO | 2007/082111 A1 | 7/2007 |
| WO | 2013172094 A1 | 11/2013 |

* cited by examiner

SEALING DEVICE

CROSS-REFERENCE TO RELATED APPLICATIONS

This application is a National Stage of International Application No. PCT/JP2014/079788, filed Nov. 11, 2014, which claims priority to Japanese Application No. 2014-005902, filed Jan. 16, 2014. The entire disclosures of each of the above applications are incorporated herein by reference.

FIELD

The present disclosure relates to a sealing device that seals an annular gap between a shaft and a housing.

BACKGROUND

PTFE (polytetrafluoroethylene) is used as a material for packings for sealing an annular gap between a shaft and a housing that move relative to each other. PTFE can be used under high temperatures and high pressures, and has excellent characteristics such as high chemical resistance and excellent sliding properties. On the other hand, PTFE has a shortcoming that it is prone to plastic deformation (settling) particularly when used in high temperature environments. If settling occurs in a sealing lip of the packing, it leads to deterioration of sealing properties.

A technique for maintaining the sealing lip in tight contact with an outer circumferential surface of a shaft or an inner circumferential surface of a shaft hole of a housing is known (see Patent Literatures 1 and 2), wherein a metal spring member is mounted in an annular mounting groove formed in the packing.

However, PTFE has a higher linear expansion coefficient than that of metal materials commonly used as the housing material. In high temperature environments, therefore, the sealing lip on an outer circumferential side of the packing (outer circumferential lip) tends to deform so as to expand radially outward, so that it is firmly pressed against the inner circumferential surface of the shaft hole of the housing. As a result, a large settling occurs in the outer circumferential lip, hence, as a countermeasure for settling, it is not sufficient to simply mount a spring member.

Conventionally, in order to prevent the metal spring member from coming off, an annular protrusion that protrudes radially inward is provided at the distal end of the outer circumferential lip. The outer circumferential lip thus has a relatively high rigidity.

CITATION LIST

Patent Literature

Patent Literature 1: Japanese Patent Application Laid-open No. 2003-247646
Patent Literature 2: Japanese Utility Model Application Laid-open No. S63-27763

SUMMARY

Technical Problem

An object of the present disclosure is to provide a sealing device that can suppress deterioration of sealing properties caused by plastic deformation (settling) of an outer circumferential lip.

Solution to Problem

The present disclosure adopts the following means to achieve the object noted above.

Specifically, a sealing device according to the present disclosure is a sealing device for sealing an annular gap between a shaft and a housing including: a packing made of resin having an outer circumferential lip on an outer circumferential side with respect to an annular mounting groove provided on a sealed fluid side and an inner circumferential lip on an inner circumferential side with respect to the annular mounting groove; and a metal spring member mounted in the mounting groove and having an outer circumferential pressing portion extending radially outward and toward the sealed fluid side from a groove bottom of the mounting groove and pressing the outer circumferential lip radially outward, and an inner circumferential pressing portion extending radially inward and toward the sealed fluid side from the groove bottom of the mounting groove and pressing the inner circumferential lip radially inward, wherein, among the outer circumferential lip and the inner circumferential lip, a protrusion that prevents the spring member from coming off is provided only on the inner circumferential lip.

The present disclosure adopts a configuration in which the protrusion for preventing the spring member from coming off is provided only on the inner circumferential lip and not on the outer circumferential lip. In this way, the rigidity of the outer circumferential lip can be lowered, so that the influence of the outer circumferential pressing portion of the spring member can be increased. Accordingly, even after the outer circumferential lip itself has undergone settling, the sealing properties provided by the outer circumferential lip can be maintained over a long time with the pressure applied by the outer circumferential pressing portion.

A thickness of the outer circumferential lip in a thinnest portion thereof on a proximal end side from a portion thereof with a largest outer diameter may be smaller than a thickness of the inner circumferential lip in a thinnest portion thereof on a proximal end side from a portion thereof with a smallest inner diameter.

In this way, when the sealing device is used in applications in which the inner circumferential lip slides against the shaft, a wear allowance can be secured for the inner circumferential lip that suffers sliding wear, while lowering the rigidity of the outer circumferential lip.

The outer circumferential lip may extend toward the sealed fluid side and beyond a distal end of the outer circumferential pressing portion of the spring member mounted in the mounting groove, and a length of the outer circumferential lip in an axial direction may be shorter than the inner circumferential lip.

In this way, the rigidity of the outer circumferential lip can be lowered while preventing the spring member from sticking out of the outer circumferential lip.

Various configurations described above may be adopted in as many combinations as possible.

Advantageous Effects of the Disclosure

As described above, according to the present disclosure, deterioration of sealing properties caused by plastic deformation (settling) of an outer circumferential lip can be suppressed.

DRAWINGS

DETAILED DESCRIPTION

Hereinafter, modes for implementing the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example

The sealing device according to an Example of the present disclosure will be described with reference to FIG. 1 to FIG. 5. The sealing device according to the present Example is used for sealing an annular gap between a shaft and a housing in various apparatuses such as turbochargers. The sealing device can suitably be used in a mechanism in which a shaft and a housing move relative to each other. The sealing device according to the present Example can be applied to any of the cases in which the shaft reciprocates, rotates, or sways relative to the housing, or to any combination of these. In the following description, an "axis line" shall mean a center axis line of a shaft.

<Configuration of Sealing Device>

The configuration of the sealing device according to the present Example will now be described. The sealing device 100 according to the present Example is configured by a packing 10 made of resin and a metal spring member 20. PTFE (polytetrafluoroethylene) containing fillers such as carbon fiber, glass fiber, bronze powder, and the like, may favorably be used as a material for the packing 10. Stainless steel may favorably be used as a material for the spring member 20.

Figure 1:
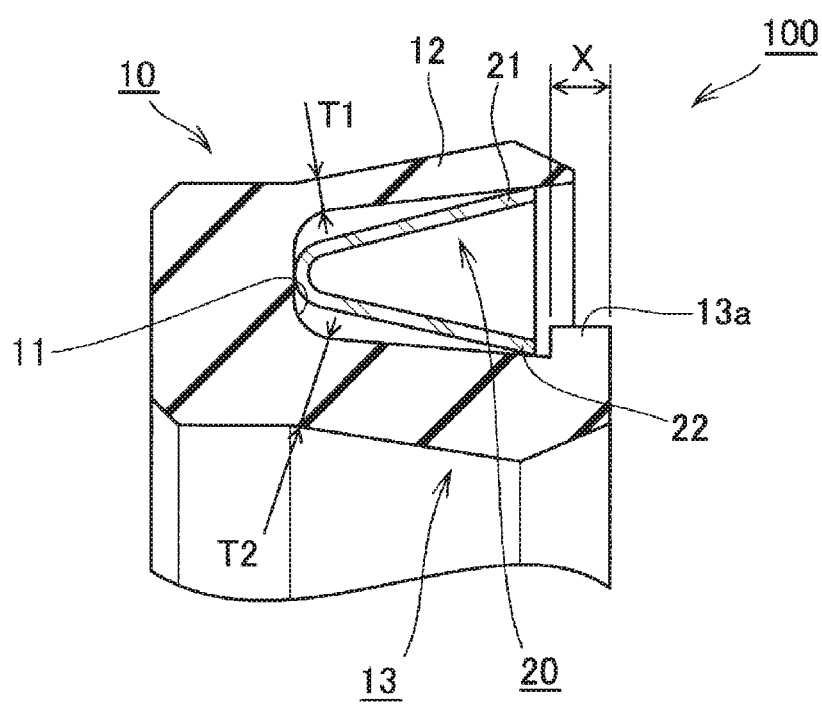
FIG. 1 is a schematic cross-sectional view of a sealing device according to an Example of the present disclosure.
Figure 2:
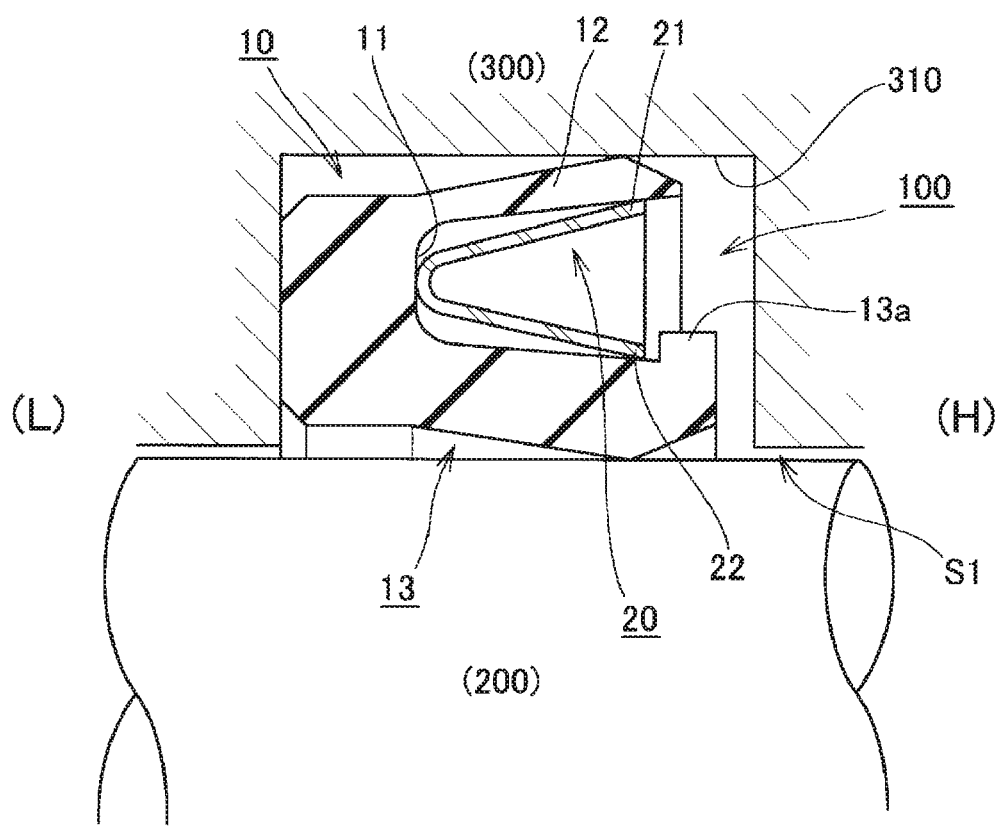
FIG. 2 is a schematic cross-sectional view of a sealing device in a mounted state according to the Example of the present disclosure.

The sealing device 100 is used for sealing an annular gap between a shaft 200 and a housing 300, as mentioned above. For example, the device is mounted in an annular groove 310 formed in an inner circumferential surface of a shaft hole in the housing 300 to seal the annular gap between the outer circumferential surface of the shaft 200 and the inner circumferential surface of the shaft hole of the housing 300 (see FIG. 2). In FIG. 2, the right side of the drawing is a sealed fluid side (high-pressure side (H)), and the left side of the drawing is a low-pressure side (L). In the present Example, the packing 10 is fixed to the housing 300 by being mounted in the annular groove 310. When the shaft 200 moves relative to the housing 300, the packing 10 and the shaft 200 slide against each other.

The packing 10 has a rotational symmetry shape. The packing 10 has an outer circumferential lip 12 on an outer circumferential side with respect to an annular mounting groove 11 provided on one side in axial direction (high-pressure side (H)) and an inner circumferential lip 13 on an inner circumferential side with respect to the annular mounting groove 11.

In the packing 10 of the present Example, in order to prevent the spring member 20 from coming off, among the outer circumferential lip 12 and the inner circumferential lip 13, an annular protrusion 13a that protrudes radially outward is provided only on the inner circumferential lip 13.

In addition, a thickness T1 of the outer circumferential lip 12 in a thinnest portion thereof on a proximal end side from a portion thereof with a largest outer diameter is designed to be smaller than a thickness T2 of the inner circumferential lip 13 in a thinnest portion thereof on a proximal end side from a portion thereof with a smallest inner diameter. Note that it is preferable to set the thicknesses to satisfy $T1<(\frac{2}{3})\times T2$.

Further, the distal end of the outer circumferential lip 12 is positioned to be within the range of width X of the protrusion 13a in the axial direction. Namely, the outer circumferential lip 12 is designed such that it extends toward the high-pressure side (H) and beyond the distal end of an outer circumferential pressing portion 21 of the spring member 20 mounted in the mounting groove 11, and such that its length in the axial direction is shorter than the inner circumferential lip 13.

The spring member 20 is mounted in the mounting groove 11 of the packing 10. This spring member 20 has the outer circumferential pressing portion 21 that extends radially outward and toward the high-pressure side (H) from a groove bottom of the mounting groove 11 and presses the outer circumferential lip 12 radially outward, and an inner circumferential pressing portion 22 that extends radially inward and toward the high-pressure side (H) from the groove bottom of the mounting groove 11 and presses the inner circumferential lip 13 radially inward.

Figure 3:
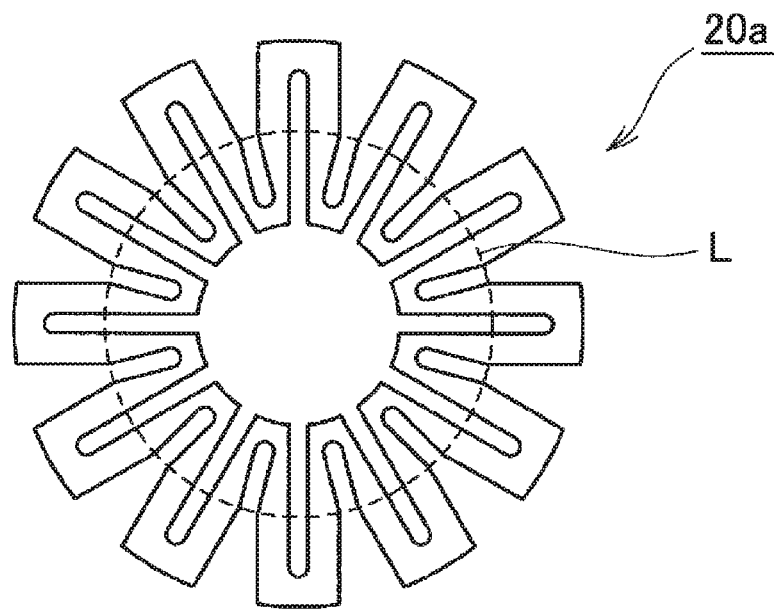
FIG. 3 is a plan view of a spring member before undergoing a bending process according to the Example of the present disclosure.
Figure 4:
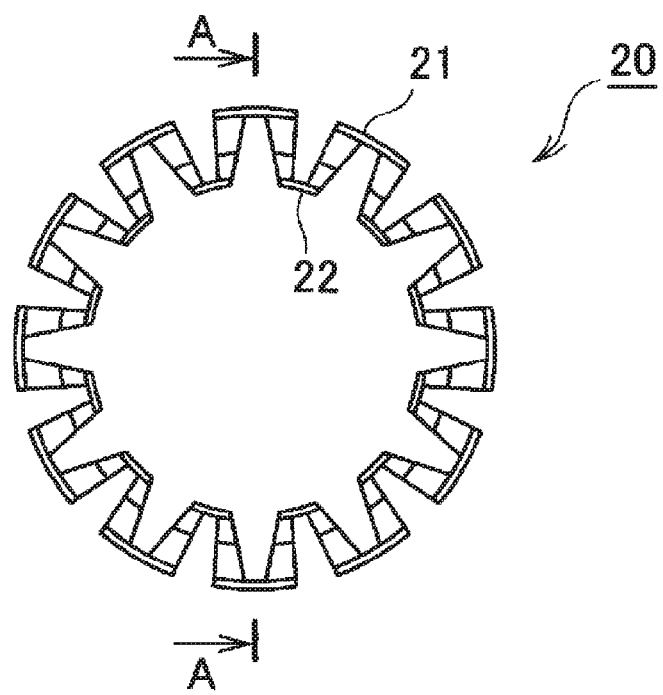
FIG. 4 is a plan view of the spring member according to the Example of the present disclosure.
Figure 5:
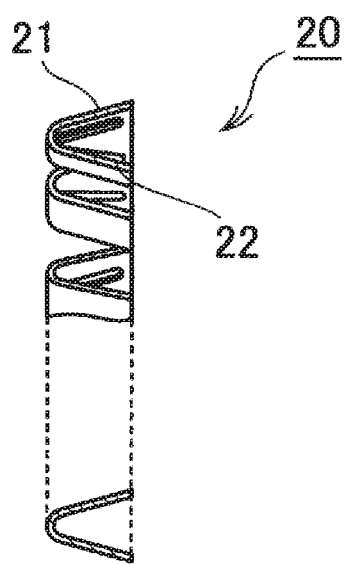
FIG. 5 is a cross-sectional view of the spring member according to the Example of the present disclosure.

The configuration and production method of this spring member 20 will be described with reference to FIG. 3 to FIG. 5. First, a metal sheet is subjected to a cutting process, to produce an intermediate product 20a that meanders in a circumferential direction (see FIG. 3). This intermediate product 20a is then folded along an imaginary circle L that passes the radial center of the intermediate product 20a such that a part on an inner side of the imaginary circle L and a part on an outer side of the imaginary circle L are folded forward relative to the paper plane of FIG. 3 along the circle L serving as a valley fold. The spring member 20 can be made this way. FIG. 4 shows a plan view of the spring member obtained by the folding process, and FIG. 5 shows a cross section along A-A in FIG. 4 (partly omitted).

<Advantages of the Sealing Device According to the Present Example>

As described above, in the sealing device 100 according to the present Example, the rigidity of the outer circumferential lip 12 of the packing 10 is lowered, so that the influence of the outer circumferential pressing portion 21 of the spring member 20 can be increased. Accordingly, deterioration of sealing properties caused by plastic deformation (settling) of the outer circumferential lip 12 can be suppressed. As has been explained in the description of the background art, in high temperature environments, the outer circumferential lip of the packing may be firmly pressed against the inner circumferential surface of the shaft hole of the housing. Thus, settling may occur in the outer circumferential lip. In this case, deterioration of sealing properties caused by the settling is more evident if the outer circumferential lip has high rigidity and the influence of the outer circumferential pressing portion of the spring member is small. On the other hand, according to the sealing device 100 of the present Example, deterioration of sealing properties due to the settling of the outer circumferential lip 12 can be suppressed by lowering the rigidity of the outer circumferential lip 12 to increase the influence of the outer circumferential pressing portion 21, as described above. This will be explained in more detail below.

In the present Example, a configuration is adopted in which the protrusion 13a that prevents the spring member 20 from coming off is provided only on the inner circumferential lip 13 of the packing 10. In this way, the rigidity of the outer circumferential lip 12 can be lowered, so that the influence of the outer circumferential pressing portion 21 of the spring member 20 can be increased. Accordingly, even after the outer circumferential lip 12 itself has undergone settling, the sealing properties provided by the outer circumferential lip 12 can be maintained over a long time with the pressure applied by the outer circumferential pressing portion 21. Moreover, forming the annular protrusion 13a on the inner circumferential lip 13 can also provide an effect of preventing the tip of the inner circumferential lip 13 from sticking out into a small gap S1 (see FIG. 2) between the shaft 200 and the housing 300.

In addition, in the present Example, the thickness T1 in the specific portion of the outer circumferential lip 12 is designed to be smaller than the thickness T2 in the specific portion of the inner circumferential lip 13. Therefore, when the sealing device 100 is used in applications in which the inner circumferential lip 13 slides against the shaft 200, a wear allowance can be secured for the inner circumferential lip 13 that suffers sliding wear. On the other hand, the rigidity of the outer circumferential lip 12 can be lowered by making its thickness smaller. Note that, these effects can be achieved more reliably by setting the thicknesses to satisfy T1<(2/3)×T2.

Moreover, in the present Example, the outer circumferential lip 12 is designed such that it extends to the high-pressure side (H) and beyond the distal end of the outer circumferential pressing portion 21 of the spring member 20 mounted in the mounting groove 11, and that its length in the axial direction is shorter than the inner circumferential lip 13. In this way, the rigidity of the outer circumferential lip 12 can be lowered while preventing the spring member 20 from sticking out of the outer circumferential lip 12. That is to say, the shorter the outer circumferential lip 12 in the axial direction, the lower the rigidity of the outer circumferential lip 12 can be. Thus, in order to prevent the spring member 20 from coming off, the length of the outer circumferential lip 12 in the axial direction may be made shorter than the inner circumferential lip 13 that is formed with an annular protrusion 13a. However, the outer circumferential pressing portion 21 of the spring member 20 needs to be prevented from sticking out of the mounting groove 11. Therefore, in the present Example, the outer circumferential lip 12 is designed as described above. By making the length of the outer circumferential lip 12 in the axial direction short, the outer circumferential lip 12 is pressed radially outward by the outer circumferential pressing portion 21 of the spring member 20 at a point closer to the tip of the lip. Therefore, by the principle of leverage, the influence of the outer circumferential pressing portion 21 of the spring member 20 can be increased as compared to when the outer circumferential lip 12 is pressed radially outward by the outer circumferential pressing portion 21 at a point away from the tip of the lip.

Since the outer circumferential lip 12 is designed to have lower rigidity as described above, it has a tendency to deform. Nevertheless, since the outer circumferential lip 12 is shorter than the inner circumferential lip 13, it will not abut on a side wall face of the annular groove 310 and will not deform excessively. On the other hand, the inner circumferential lip 13 may abut on a side wall face of the annular groove 310, but since it is thick and has high rigidity due to a provision of the annular protrusion 13a, it would not deform excessively.

A comparison test was conducted to compare the sealing device 100 according to the present Example and a currently used sealing device in respect of durability. The currently used sealing device that was tested is designed such that the inner circumferential lip and outer circumferential lip have the same thickness and length in the axial direction, and are both provided with an annular protrusion for preventing the spring member from coming off. The durability test was conducted as follows: First, test samples were left in a high temperature environment of 260° C. for 100 hours. After that, the interference of the outer circumferential lip was measured in an environment of −30° C. The initial interference was 0.45 mm in both of the currently used sealing device and the sealing device 100 according to the present Example. According to the results of the durability test, while the interference of the outer circumferential lip decreased as low as to 0.1 mm in the currently used sealing device, the interference of the outer circumferential lip 12 was 0.25 mm in the sealing device 100 according to the present Example. As described above, it was confirmed that, by adopting the sealing device 100 according to the present Example, deterioration of sealing properties due to settling of the outer circumferential lip 12 could be suppressed.

REFERENCE SIGNS LIST

10 Packing
11 Mounting groove
12 Outer circumferential lip
13 Inner circumferential lip
13a Protrusion
20 Spring member
20a Intermediate product
21 Outer circumferential pressing portion
22 Inner circumferential pressing portion
100 Sealing device
200 Shaft
300 Housing
310 Annular groove
S1 Small gap

The invention claimed is:

1. A sealing device for sealing an annular gap between a shaft and a housing comprising:
   a packing made of resin having an outer circumferential lip on an outer circumferential side with respect to an annular mounting groove provided on a sealed fluid side and an inner circumferential lip on an inner circumferential side with respect to the annular mounting groove; and
   a metal spring member mounted in the mounting groove and having an outer circumferential pressing portion extending radially outward and toward the sealed fluid side from a groove bottom of the mounting groove and pressing the outer circumferential lip radially outward, and an inner circumferential pressing portion extending radially inward and toward the sealed fluid side from the groove bottom of the mounting groove and pressing the inner circumferential lip radially inward,
   wherein, among the outer circumferential lip and the inner circumferential lip, a protrusion that prevents the spring member from coming off is provided only on the inner circumferential lip, wherein a thickness T1 of the outer circumferential lip in a thinnest portion thereof on a proximal end side from a portion thereof with a largest outer diameter is smaller than a thickness T2 of the inner circumferential lip in a thinnest portion thereof on a proximal end side from a portion thereof with a smallest inner diameter, wherein the outer circumferential lip extends toward the sealed fluid side and beyond a distal end of the outer circumferential pressing portion of the spring member mounted in the mounting groove, and a length of the outer circumferential lip in an axial direction is shorter than the inner circumferential lip.

2. The sealing device according to claim 1, wherein the thickness T1 of the outer circumferential lip in a thinnest portion thereof on a proximal end side from a portion thereof with a largest outer diameter is less than ⅔ of the thickness T2 of the inner circumferential lip in a thinnest portion thereof on a proximal end side from a portion thereof with a smallest inner diameter.

* * * * *